United States Patent [19]
Dotti et al.

[11] Patent Number: 4,757,700
[45] Date of Patent: Jul. 19, 1988

[54] PROCESS FOR FORMING FLEXIBLE TUBULAR BODIES WITH MULTIPLE HELICAL ELEMENTS

[75] Inventors: Enrico Dotti, Milan; Angelo Sala, Merate, both of Italy

[73] Assignee: Societa' Cavi Pirelli S.p.A., Milan, Italy

[21] Appl. No.: 828,631

[22] Filed: Feb. 10, 1986

[30] Foreign Application Priority Data

Feb. 15, 1985 [IT] Italy .............................. 19536 A/85

[51] Int. Cl.⁴ ...................... B21D 11/06; B21D 11/14; B21D 31/00
[52] U.S. Cl. .......................................... 72/66; 72/371
[58] Field of Search ............... 29/33 D, 429, 433, 456; 72/49, 50, 66, 135, 137, 371; 140/149; 228/17.5, 17.7, 145

[56] References Cited

U.S. PATENT DOCUMENTS

| | | | |
|---|---|---|---|
| 2,003,673 | 6/1935 | Zapf | 72/66 X |
| 3,006,400 | 10/1961 | Foster | 72/371 X |
| 3,646,793 | 3/1972 | Teraoka | 72/137 |
| 4,287,743 | 9/1981 | Hantschk | 72/371 X |

FOREIGN PATENT DOCUMENTS

| | | | |
|---|---|---|---|
| 117814 | 5/1930 | Austria | 72/135 |
| 3017378 | 11/1981 | Fed. Rep. of Germany | 29/456 |

*Primary Examiner*—E. Michael Combs
*Attorney, Agent, or Firm*—Brooks Haidt Haffner & Delahunty

[57] ABSTRACT

Process and apparatus for making a flexible tube comprising a plurality of helicoidal metal members in side-by-side relation. In the process, metal strips, shaped to the desired configuration, are twisted around their longitudinal axes to helicoidal shape, the twisting being sufficient to cause the shape to be retained if the strip is released. Thereafter, the so-shaped strip is bent around an axis extending in the width direction of the strip by an amount sufficient to cause the strip to have a radius substantially equal to the tube radius. The strips are then laid up, side-by-side into a tube. The apparatus comprises a rotatable cage carrying bobbins having the strips thereon, two pairs of preshaping rollers to produce the twist and the bend mounted for rotation with the cage, a mold for laying up the helicoidal strips, a guide element for the strips intermediate the rollers and the mold and a take-up bobbin or drum for winding up the tube as it leaves the mold.

4 Claims, 2 Drawing Sheets

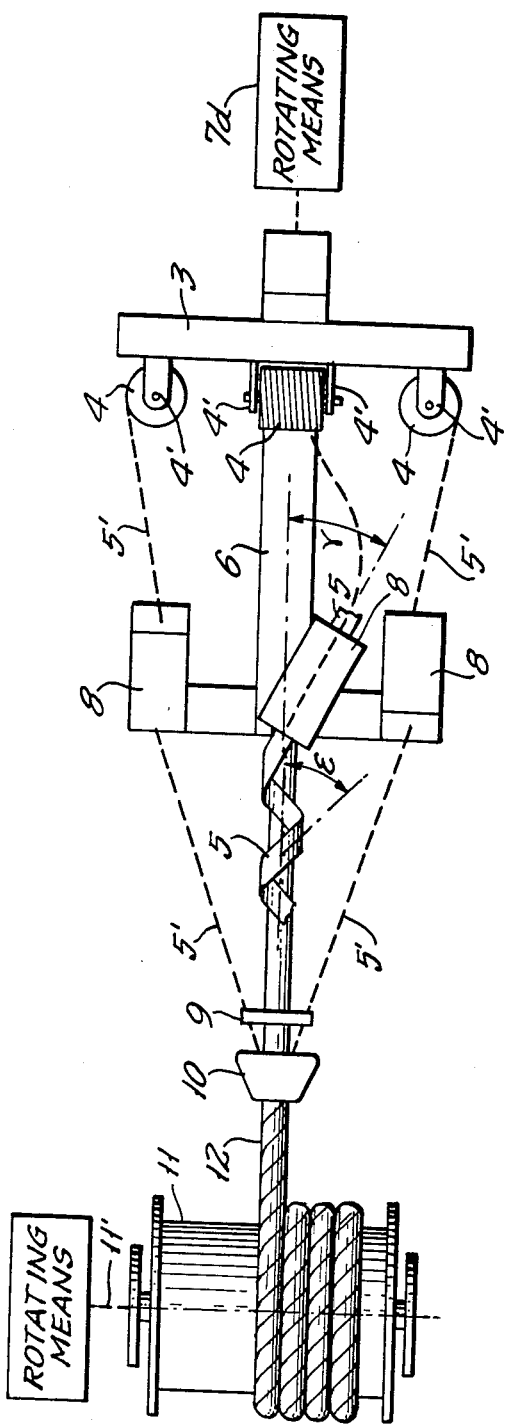
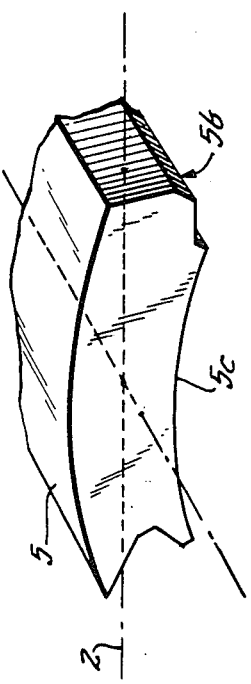
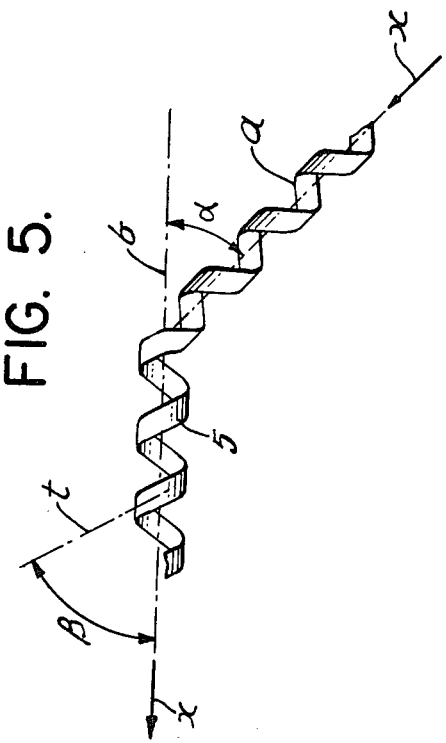

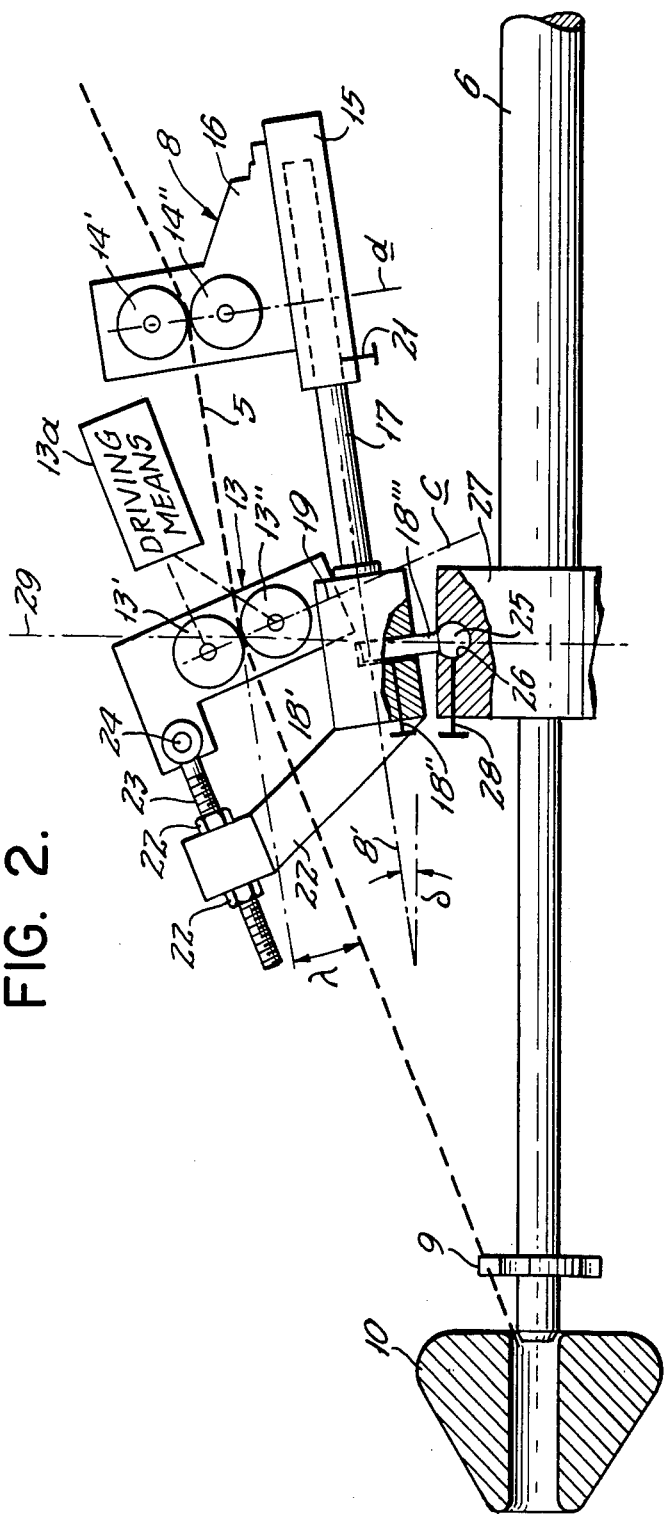
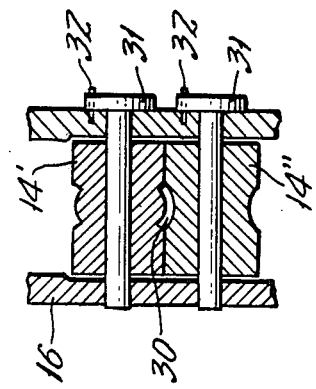
FIG. 2.
FIG. 3A.
FIG. 3B.
FIG. 4.

PROCESS FOR FORMING FLEXIBLE TUBULAR BODIES WITH MULTIPLE HELICAL ELEMENTS

The present invention relates to a process for forming flexible tubular bodies which are constituted by a plurality of shaped metallic members permanently deformed into a helical configuration and placed in side-by-side relation to form the tubular body. Such bodies are adapted to form reinforcements for pipes, in particular submarine pipes, and cable armors, for example, cable armors for optical fiber cables and the like.

The present invention also relates to an apparatus for carrying out such process.

Processes and apparatus for realizing tubular bodies of the type briefly described above are known.

A first known process provides for permanently deforming in continuous manner, according to a helical configuration, a plurality of shaped metallic members and then laying them up together so as to provide a tubular body. According to this first known process, the permanent helical deformation of each shaped member takes place through two successive permanent deformations.

In particular, a first permanent bending deformation is carried out in the wider median plane of the shaped member, usually called "saber-like deformation" and is followed by a second permanent torsional deformation of the shaped member. The drawback of the first known process is a consequence of the fact that a length variation in the edges of the shaped member takes place during the saber-like deformation, which is the first permanent bending deformation. During the second permanent torsional deformation, applied to the shaped member to cause formation of the helicoid, a deformation in opposite direction is applied to said shaped member edges to make such edges of equal length. Accordingly, during the second permanent torsional deformation, a modification, in the direction opposite to the permanent bending deformation to which the shaped member had previously been subjected, is caused.

It follows that the material of the shaped members is subjected to considerable mechanical stresses with the risk of reducing the resistance characteristics of the members and of also obtaining shaped members not perfectly shaped according to helicoids at the lateral edges so that when the shaped members are laid up together for forming a tubular body, such members are under stress.

A second known process provides for permanently deforming, through torsion, a plurality of shaped members around their longitudinal axes and subsequently elastically and helicoidally winding them on a mandrel while placing one near the other so as to realize a tubular body without giving further permanent deformations to the members.

The tubular bodies obtained by means of this second known process have an unstable configuration since all the shaped member components are permanently under stress.

One object of the present invention is that of overcoming the drawbacks of the known processes and reducing to a minimum the mechanical stresses applied to the material forming the shaped members and thereby obtaining tubular bodies devoid of stresses and consequently, devoid of unstable configurations while providing an accurate helical configuration at all points of the shaped member components.

A further object of the present invention is to provide a process for forming a flexible tubular body constituted by a plurality of shaped metallic members placed side-by-side and permanently deformed into helicoidal shapes, the permanent helicoidal deformation of the shaped members being carried out before laying them up together to provide the tubular body, said process being characterized by the fact that the helicoidal deformation of the shaped members comprises the step of permanently deforming, by means of torsion, each shaped member around its own longitudinal axis and the successive step of permanently deforming, through a bending action, each shaped member around the transverse axis of the cross-section of the shaped member which is substantially parallel to the side which will constitute the inner cylindrical surface of the tubular body.

Another object of the present invention is to provide apparatus for forming a flexible tubular body constituted by a plurality of shaped metallic members, permanently deformed according to a helicoidal configuration and placed side-by-side, which apparatus, in its preferred form, comprises:

(a) a plurality of bobbins for carrying the shaped members, the bobbins being mounted on a rotatable cage;
(b) a plurality of pre-shaping dies, one for each shaped member, mounted on a shaft rotatable with the cage and downstream of the cage; and
(c) a non-rotatable laying-up die coaxial with the rotating shaft and downstream of the pre-shaping dies.

Said apparatus is characterized by the fact that each pre-shaping die comprises two pairs of rollers supported by a frame with means for changing the distance between the pairs of rollers and the axes of rotation of the rollers being parallel to one another. Means are provided for changing the inclination of the frame both with respect to the axis of rotation of the shaft and with respect to an axis perpendicular to the axis of rotation of the shaft.

Other objects and advantages of the present invention will be apparent from the following detailed description of the presently preferred embodiments thereof, which description should be considered in conjunction with the accompanying drawings in which:

FIG. 1 is a schematic plan view of a preferred embodiment of the invention;

FIG. 2 is an enlarged, longitudinal, side view, partly in cross-section, of a portion of the apparatus shown in FIG. 1;

FIGS. 3A and 3B are enlarged, cross-sectional views of the rollers shown in FIG. 2;

FIG. 4 is an end view of the guiding device shown in FIG. 2;

FIG. 5 is a schematic showing of the configuration of a shaped member downstream of the device which gives a helical permanent configuration to it and as it is incorporated in the tubular body; and FIG. 6 is a perspective view, on greatly enlarged scale, of a portion of an illustrative shaped member.

The process, according to the present invention, for forming a tubular body obtained by laying up a plurality of shaped members permanently deformed according to a helical configuration comprises the steps described hereinafter.

A plurality of shaped members, e.g., members having a shape of the type illustrated in FIG. 6, which correspond in number to the number selected for forming a predetermined tubular body are firstly permanently deformed into a helicoidal shape and subsequently the shaped members are laid up together. Preferably, each member 5 is curved transversely to the longitudinal axis 1, as illustrated in FIG. 6, and is shaped at its side edge portions 5a and 5b so that each side edge portion interfits with the side edge portions of the adjacent members when the members are laid up to form the tubular body.

The permanent helicoidal deformation of each shaped member takes place through the steps described hereinafter.

Each shaped member is at first permanently deformed according to a helical configuration through a mere torsion or twisting around its own longitudinal axis, the axis 1 in FIG. 6.

In particular, the deformation through twisting of each shaped member 5 is carried out so as to obtain a helix having a pitch which is a function of the diameter and of the pitch that the helical member will have when it is assembled with the other shaped members 5 to constitute the tubular body.

More specifically, the parameters which link the pitch of the helix obtained in consequence of the deformation through a twisting of each shaped member to the diameter of the tubular body to be formed and to the pitch of the helicoid which such shaped member possesses in said tubular body are the following:

$$p_t = \sqrt{\pi^2 d_t^2 + p_c^2}$$

where:

$p_t$ is the pitch of the helix obtained in consequence of the deformation through twisting;

$d_t$ is the average diameter of the tubular body; and $p_c$ is the pitch of the helicoid of the shaped member when it is part of the tubular body formed by the laying-up of said shaped members.

Thereafter, a permanent deformation through a mere bending around an axis 2 (see FIG. 6) of the cross-section of the shaped member substantially parallel to the side 5c which will constitute the inner surface of the tubular body is given to each shaped member.

Each shaped member after being submitted to the two previously described steps has a helical configuration, and at this stage, all the shaped members can be laid up for forming the tubular body.

According to the process of the present invention, the step of laying up together the individual shaped members, already permanently deformed into helicoidal shape, is characterized by conveying them to the laying up point, moving them in the direction of the arrow x (FIG. 5), with the axis a of each helicoid forming with the axis b of the tubular body at an angle α equal to the angle of inclination β which the tangent t parallel to the longitudinal axis of each shaped member forms with the axis b of the tubular body itself.

The process according to the present invention and which is described hereinbefore may be carried out by means of apparatus which is also part of the present invention.

As shown in FIG. 1, the preferred embodiment of the apparatus comprises a rotatable cage 3 which carries a plurality of bobbins 4. Each bobbin has a length of a shaped metallic member 5 wrapped thereon and which moves along the path represented by the dashed line 5'. The bobbins 4 are free to rotate with respect to the brackets 4' that support the bobbin shafts, but the brackets 4' are fixedly secured to the rotatable cage 3.

The rotatable cage 3 is secured to a shaft 6 so as to rotate therewith, and the shaft 6 is mounted on a support 7, connected to a rotating means 7a.

A plurality of pre-shaping dies 8, one for each shaped member 5 and described hereinafter, are mounted on the shaft 6. Downstream of the pre-shaping dies 8, there is a guiding element 9 for the shaped members, the details of which will be described hereinafter.

Downstream of the guiding element 9, there is a laying up mold or die 10 for laying up the shaped members 5, and downstream of the mold 10, there is a motor-driven, collecting bobbin 11 on which the tubular body 12 resulting from the laying up of the shaped members is wound.

As previously stated, there is a pre-shaping die 8 for each shaped member 5. The pre-shaping die 8, shown schematically in FIG. 1, is shown in enlarged scale and in further detail in FIG. 2 and comprises two pairs of rollers 13 and 14.

The rollers 13', 13" and 14' and 14", forming the pairs of rollers 13 and 14, have their axes parallel to one another. Moreover, the axis of the rollers 13' and 13" of the pair of rollers 13 d plane c which contains the axis of said rollers 13', 13", whereas the axes of rotation of the rollers 14' and 14" of the pair of rollers 14 define another plane d which contains the axes of said rollers 14', 14", and these two planes c and d preferably, converge toward each other in the direction of the shaft 6.

The pairs of rollers 13 and 14 are mounted on a frame which permits the distance between them to be changed. Said frame comprises a box-like body 15 which supports a pair of plates 16 (only one plate 16 being shown in FIG. 2) between which there are interposed the rollers 14' and 14" of the pair 14. The box-like body 15 slidably receives a rod 17 which projects from a box-like body 18 on which, at point 19, there are pivotally mounted two plates 20 (only one plate 20 being shown in FIG. 2) for supporting the rollers 13' and 13" of the pair of rollers 13.

Since the box-like body 15 is slidable on the rod 17 but can be secured in a fixed axial position on the rod 17 by means, such as, for example, a screw 21 or the like, the distance between the box-like bodies 15 and 18 and, therefore, the distance between the pairs of rollers 13 and 14 can be varied.

The box-like body 18 also supports a projecting bracket 22 at the free end of which there is a threaded rod 23 pivotally secured at point 24 to an extension of one of the brackets 20 which supports the pair of rollers 13. By adjustment of a pair of threaded bushings 23' on the rod 23, the relative inclination between the planes c and d of the pairs of rollers 13 and 14 can be varied.

The box-like body 18 is also provided with a blind hole 18' into which a rod 18''' can slide. The relative positions of the body 18 and the rod 18''' can be set by a pin or screw 18''. The rod 18''' has a spherical head 25 received in a slot 26, of complementary shape, in a cylindrical enlargement 27 of the shaft 6. With this construction, it is possible to change the distance measured on the axis 29 between the surface of mutual contact of the pair of rollers 13 and the axis of the shaft 6.

Said enlargement 27 is also provided with a means 28 by which it is possible to fix the rotation position of the spherical head 25 within the corresponding slot 26.

The coupling of the spherical head 25 with the slot 26 of complementary shape in the cylindrical enlargement 27 of the shaft 6 permits the orientation of each pre-shaping die 8 so that the axis 8' of the die 8 has an inclination at an angle δ (FIG. 2) with respect to the axis of the shaft 6 and an angle γ (FIG. 1) with respect to the plane containing the axes 6 and 29. The importance of these angles will be described hereinafter.

Details of the pairs of rollers 13 and 14 of the pre-shaping die 8 are shown in FIGS. 3A and 3B. FIG. 3A shows an axial cross-sectional view of the pair of rollers 14, while FIG. 3B shows an axial cross-sectional view of the pair of rollers 13.

As shown in FIG. 3A the rollers 14' and 14" have a surface of revolution shaped so as to provide, in the zone of mutual contact, a cavity 30 having the shape of the cross-section of the shaped member 5 which it has on the dispensing bobbins 4. The shafts of the rollers 14' and 14" can be provided with means, known per se, to block them and thereby prevent their rotation. Said means are, for example, constituted by a head 31 having a hole to receive a pin 32 which extends through said head 31 and into the bracket 16.

FIG. 3B shows, in axial cross-section, the pair of rollers 13', 13" which have surfaces of revolution shaped in such a way so as to provide, in the zone of mutual contact, a cavity 33, the shape of which is the same as the shape of the cross-section of the shaped member 5.

A characteristic of the rollers 13' and 13" is that they have a smaller radius than the permanent bending curvature radius to be imparted to the shaped member 5 and, more specifically, smaller than the permanent bending curvature radius that the shaped member 5 has in the tubular body formed by said shaped members to allow the obtaining, by adjustments of the direction of the pre-shaping dies 8 with respect to the axis 6 of the apparatus, the desired permanent bending deformation of the shaped member around its axis 2 (see FIG. 6).

Although the rollers 13' and 13" may be merely freely rotatable, according to an alternative embodiment of the apparatus according to the invention, the rollers 13' and 13" may be driven by a motor driving means 13a to facilitate the advancing of the shaped members 5.

By comparing FIGS. 3A and 3B, it is evident that the shape of the cavity 33 at the surfaces in mutual contact of the pair of rollers 13 is rotated by 180° with respect to the shape of the cavity 30 in the zone of contact between the pair of rollers 14. The purpose of this is to impart a permanent torsion to the shaped member 5. However, this action can be also obtained by maintaining the shapes of the cavities 33 and 30 with the same orientation provided that a complete rotation is imparted to the shaped member 5 between the pairs of rollers.

As previously stated, downstream of the pre-shaping die and mounted on the shaft 6 there is a guiding element 9 to guide the shaped members in their passage between the outlet of the pre-shaping dies 8 and the inlet of the laying-up head 10 from which the tubular body 12 issues.

FIG. 4 represents the guiding element 9 in front view and in enlarged scale to clarify its characteristics. As shown in FIG. 4, the guiding element 9 is constituted by a cylindrical body 34 provided at its periphery with a plurality of grooves 35, the number of which is equal to the number of the shaped members 5 selected to form the tubular body 12. Preferably, the individual, shaped members 5 are in contact with the guiding element 9 at one of their faces of smaller dimensions.

The operation of the apparatus according to the invention is as set forth hereinafter.

Each shaped member 5 coming from the bobbins 4 of the rotating cage 3 passes, following the path 5', into the first pair of rollers 14 of the pre-shaping die and after having been rotated of 180° around its own longitudinal axis traverses the pair of rollers 13 and then, leaves the pre-shaping die.

The distance existing between the pairs of rollers 13 and 14 is adjusted in such a way that in the portion existing between them the shaped member 5 receives a permanent torsional deformation resulting in a shape which is a helix, the pitch of which is a function of the diameter and of the pitch which the helicoid will have in the tubular body 12 formed by said shaped members 5. Said function has been previously described.

As previously mentioned, said distance between the pairs of rollers 13 and 14 is determined by changing the distance between the box-like bodies 15 and 18 and fixing the position of the box-like body 15 by means of the element 21 which engages the rod 17.

When each shaped member 5 comes out from between the pair of rollers 13, it has a permanent bending deformation around the axis 2 (see FIG. 6) due to the partial winding thereof on the roller 13", which is the lower roller of the pair of rollers 13. Said effect is determined by the angle λ (FIG. 2) which is obtained by changing the magnitude of the angle δ of the pre-shaping die with respect to the axis of the shaft 6. For example, in the case of shaped members 5 of material having a relatively low elastic limit, such as aluminum alloys, the angle λ can have values between 5 and 10 degrees, whereas for steels having a high elastic limit, the values can be as high as 90 degrees.

The angle δ and the diameter of the rollers 13' and 13" are selected in such a way that the permanent bending deformation of the shaped member 5 effects a radius of curvature equal to the one that the shaped member 5 must have in the tubular body 12 formed by said shaped members, and by means of this information, one skilled in the art is able to determine the entire range of values to be used with the materials employed for the members 5.

The variation of inclination which can be carried out by means of the threaded rod 23—bushing 23' assembly is needed only to effect a fine adjustment to obtain the desired bending.

The orientation of the rotation angle γ (FIG. 1) of each pre-shaping die around the axis 29 has the purpose of avoiding distortion of the shaped member 5 when it comes out of the pre-shaping die so as thereby to avoid alterations in the correct helical configuration of the shaped members 5.

The selection of the angle γ must be effected so that it is equal to the angle ε (see FIG. 1), formed by the tangent t to, and parallel to the axis of, the helicoid being pulled, and the axis of the helicoid when it comes out of the pre-shaping die.

When each shaped member 5 comes out of the pair of rollers 13, it has a permanent helical configuration and is conveyed to the laying-up head 10 by means of a guiding element 9.

Although the rollers of the pairs 13 and 14 can be all freely rotatable, it is preferable that the rollers of the pair 14 are prevented from rotation. In this situation, the helicoids, obtained through the permanent deformation of the shaped member 5, are under tension in the portion thereof between the outlet of the pre-shaping dies 8 and their inlet into the laying-up head 10. It is important for the present invention that said tension does not cause permanent deformations of the already shaped members 5 so that the deformation due to the tension must only be an elastic deformation.

In addition, the distance, in the radial direction of the pre-shaping dies from the shaft 6, will have to be set by acting on the rod 18''' so that the shaped members 5 can arrive in front of the laying-up head 10 with the position which they must have in the tubular body 12 without being subjected to additional stresses.

In the description of the previously described embodiment of a device according to the invention, the assembly comprising the bobbin-holder cage 3 and the pre-shaping dies rotates around the axis of the shaft 6 and the motor-driven collecting bobbins 11 rotates around its fixed axis 11'. This must not be understood in a limiting sense since, with the present invention, it is possible to make the assembly comprising the bobbin-holder cage 3 and the pre-shaping dies non-rotatable, while the motor-driven collecting bobbin 11 is rotated about its axis 11' and the bobbin 11 is also rotated around the axis of the body 12.

From the previous description of the process according to the invention, of the apparatus for carrying into effect the process, of the operation of the apparatus and from the considerations hereinafter set forth, it will be apparent that the objects of the invention are achieved.

The fact that each shaped member is subjected, at first, to a permanent mere torsional deformation around the longitudinal axis which is followed by a permanent bending deformation around an axis of the cross-section of the shaped member which is substantially parallel to the side thereof which will constitute the inner surface of the tubular body 12 permits the obtaining of a helical configuration with a series of deformations, the effects of which are cumulative without one deformation modifying what is obtained with the other deformation. This means that the stresses to which the material of the shaped member 5 is subjected in order to reach the helical configuration are the minimum possible stresses.

Moreover, the fact that the individual shaped members 5, already permanently deformed according to helicoids, are conveyed to the laying-up point by causing them (between the shaping zone and the laying-up zone) to form with the axis of the tubular body 12 an angle equal to the angle of inclination which, in the tubular body 12, the tangent at any point to the longitudinal axis of each shaped member forms with the axis of said tubular body 12, avoids the arising of stresses in the shaped members 5 which cause deformations preventing the correct configuration of the tubular body itself.

In addition, the fact that the shaped members 5, in their passage between the shaping zone and the laying-up zone, contribute to maintaining constant the previously reported angle, result in the correct formation of the tubular body 12.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. A process for making a flexible tubular body comprising a plurality of elongated, helicoidal, metal members placed side-by-side, said process comprising:
    while advancing relatively long and narrow metal strips, for forming each of said members, in the direction of the lengths of the strips, twisting each of said strips around its longitudinal axis by an amount sufficient to form it into a helical configuration which it will retain after release;
    after forming each of said strips into said helical configuration and while advancing each of said strips, bending each strip of helical configuration around the transverse axis of the cross-section of the strip which is both perpendicular to said longitudinal axis of the strip and is substantially parallel to the face of the strip which will constitute the inner surface of the tubular body by an amount which causes permanent bending deformation around said transverse axis
    laying the so-shaped and bent strips in side-by-side relation to form said tubular body.

2. Process as set forth in claim 1, wherein the twisting of each strip is carried out by twisting each strip into a helicoidal shape having a pitch which is related to the diameter and to the pitch of the strip which it has in said tubular body by the formula:

$$p_t = \sqrt{\pi^2 d_t + p_c^2}$$

where
   $p_t$ is the pitch of the helix obtained in consequence of the twisting deformation;
   $d_t$ is the average diameter of the tubular body
   $p_c$ is the pitch of the helicoid of the shaped member present in the tubular body.

3. A process as set forth in claim 2 wherein the bending of each strip around said transverse axis is carried out by bending said strip to a radius smaller than the radius of said tubular member.

4. Process as set forth in claim 3 wherein in advance of the laying up of the so-shaped and bent strips, each strip is advanced toward the laying up point an angle to the axis of said tubular body which is substantially equal to the angle between a line tangent to the external surface of the helicoidal shaped strip and parallel to the longitudinal axis of the helicoidal shaped strip and said axis of said tubular body.

* * * * *

UNITED STATES PATENT AND TRADEMARK OFFICE
CERTIFICATE OF CORRECTION

PATENT NO. : 4,757,700

DATED : July 19, 1988

INVENTOR(S) : Dotti et al

It is certified that error appears in the above-identified patent and that said Letters Patent is hereby corrected as shown below:

Col. 4, line 15, cancel the period (.) before "shaped";

Col. 4, line 26, after "13" cancel "d" and insert --define a--.

Signed and Sealed this

Seventeenth Day of January, 1989

*Attest:*

DONALD J. QUIGG

*Attesting Officer*    *Commissioner of Patents and Trademarks*